March 3, 1931.  I. F. DITTMAR  1,794,758

SAWING MACHINE

Filed Feb. 21, 1927   8 Sheets-Sheet 1

Inventor

I. F. DITTMAR.

By
Attorney

March 3, 1931.   I. F. DITTMAR   1,794,758
SAWING MACHINE
Filed Feb. 21, 1927   8 Sheets-Sheet 2

Inventor
I. F. DITTMAR.
By
Attorney

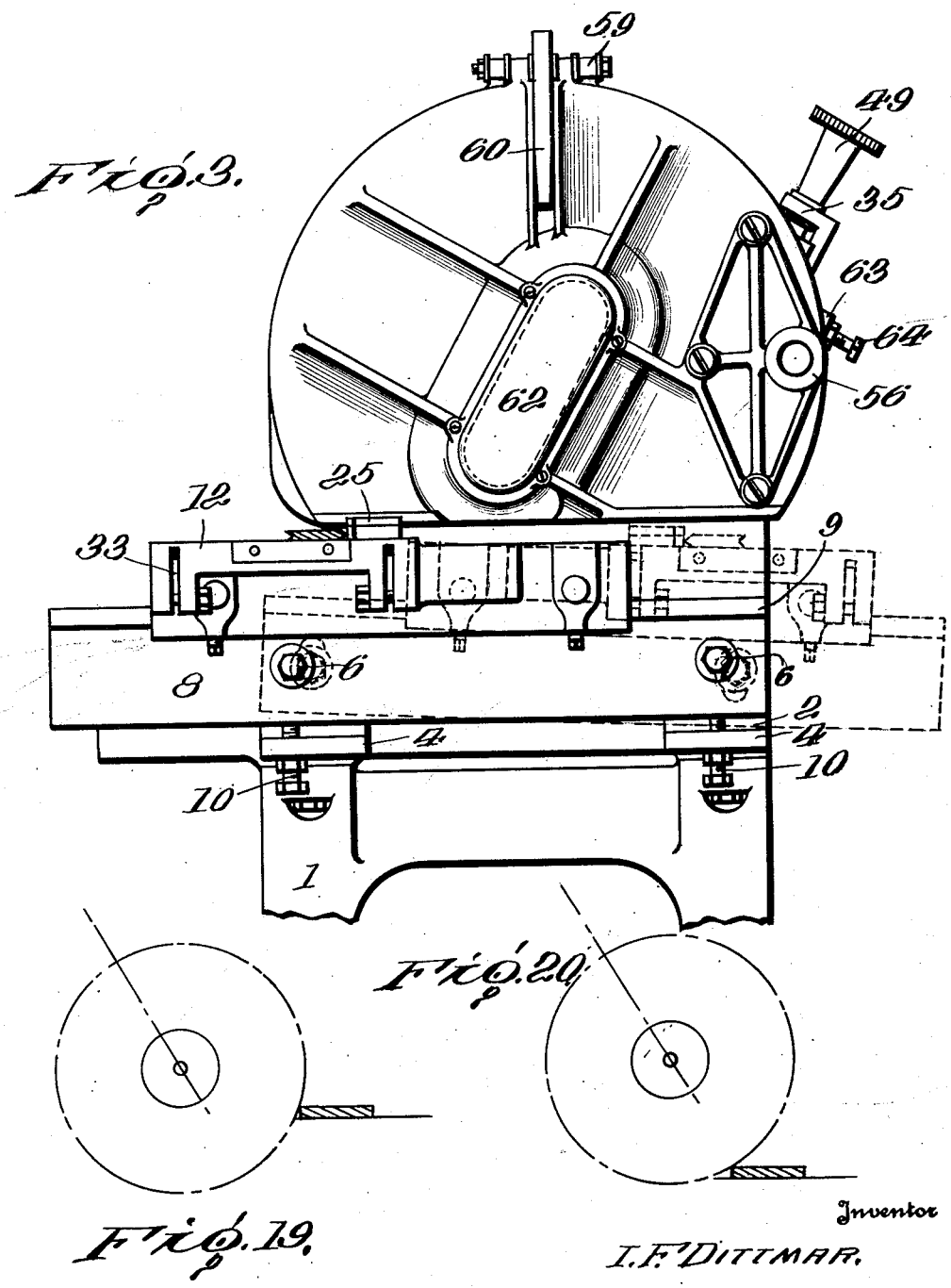

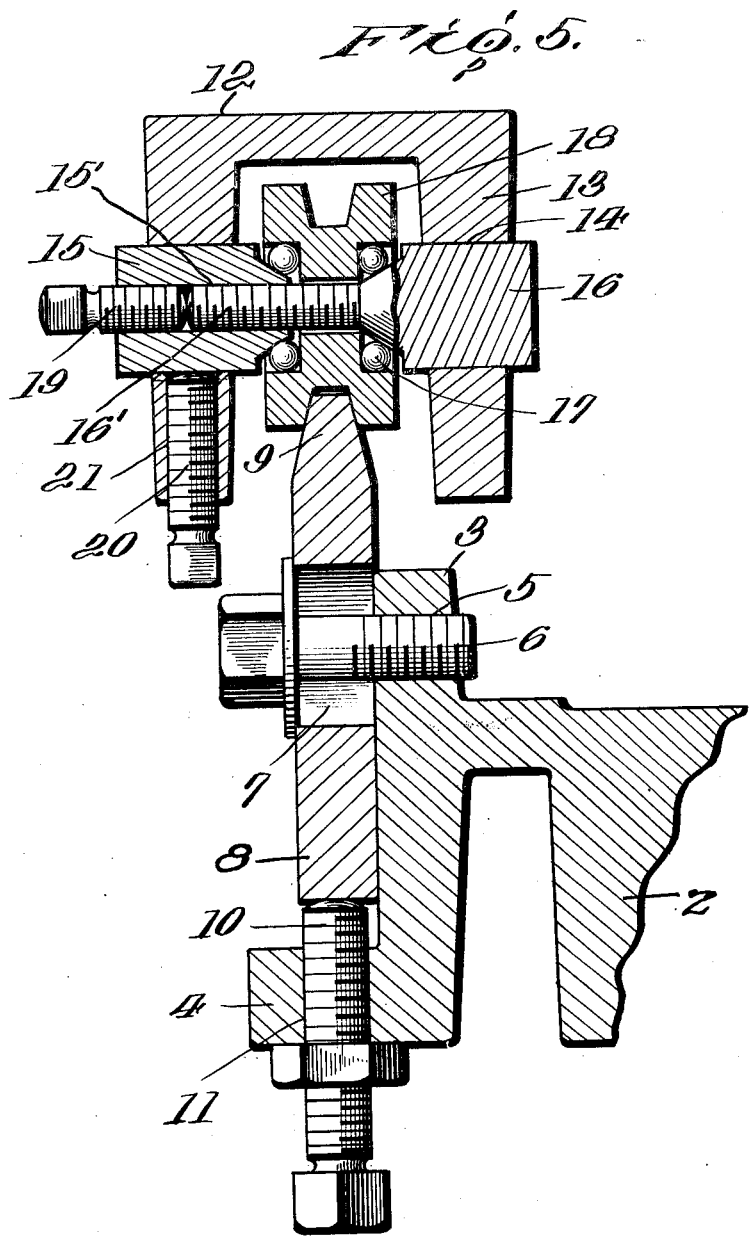

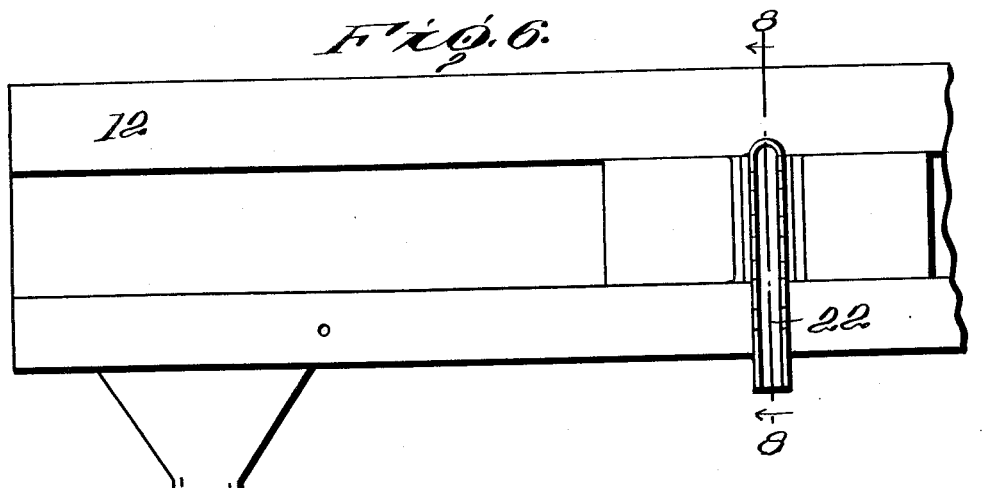
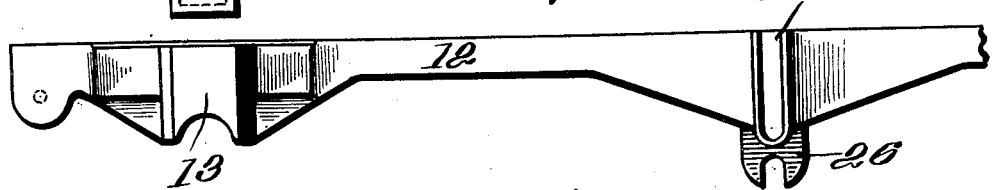
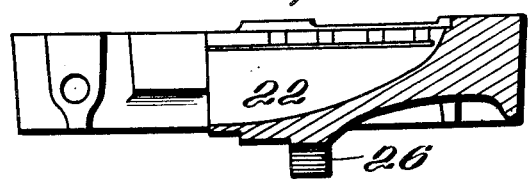
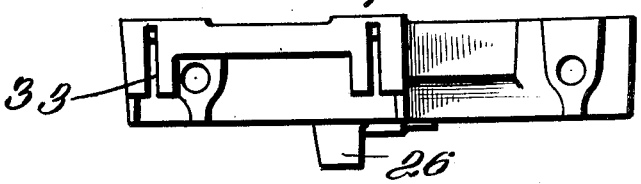

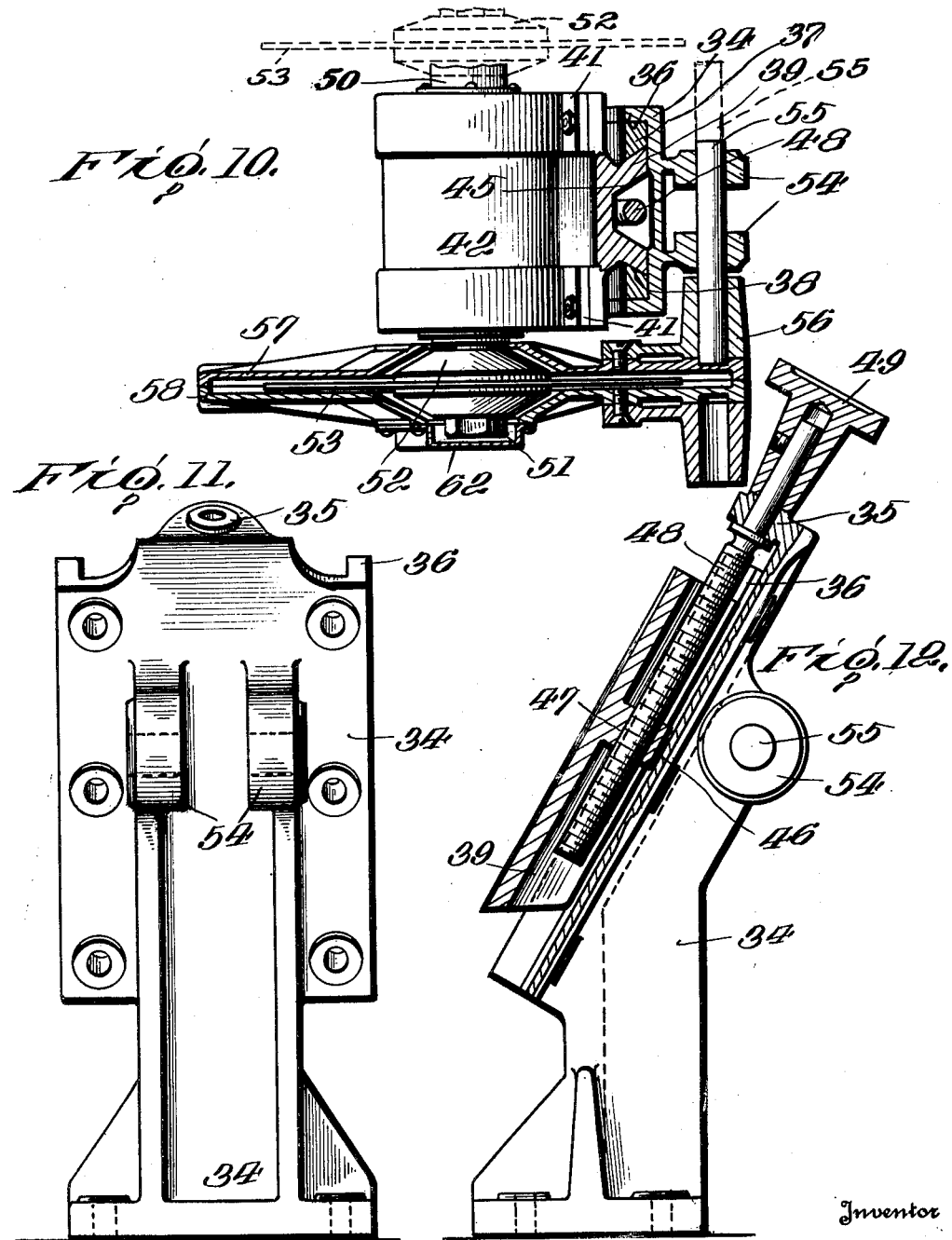

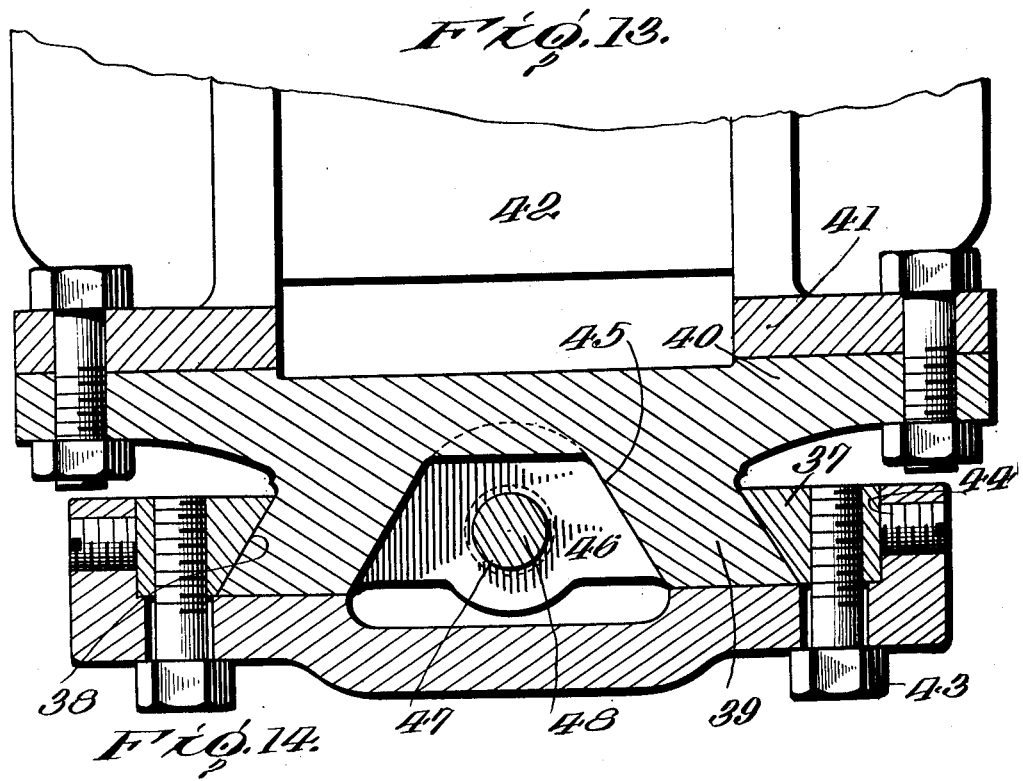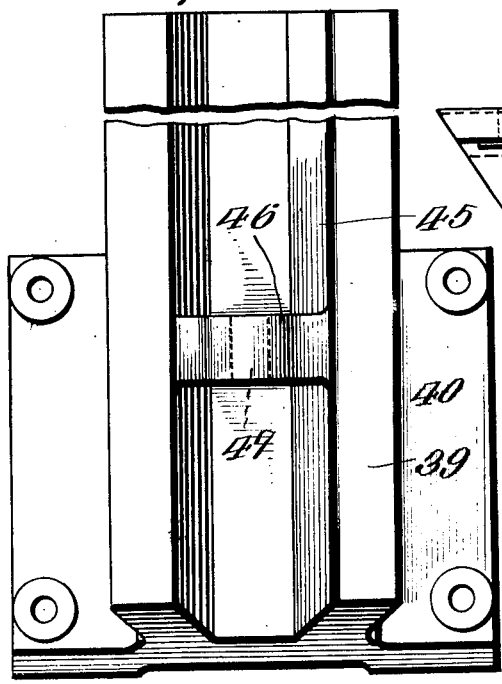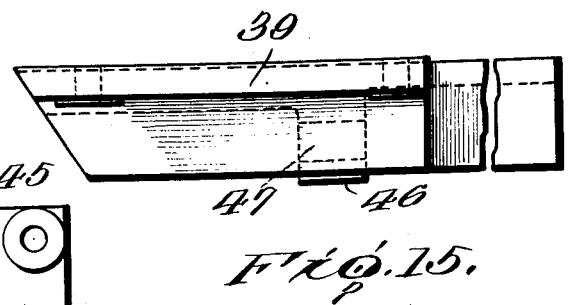

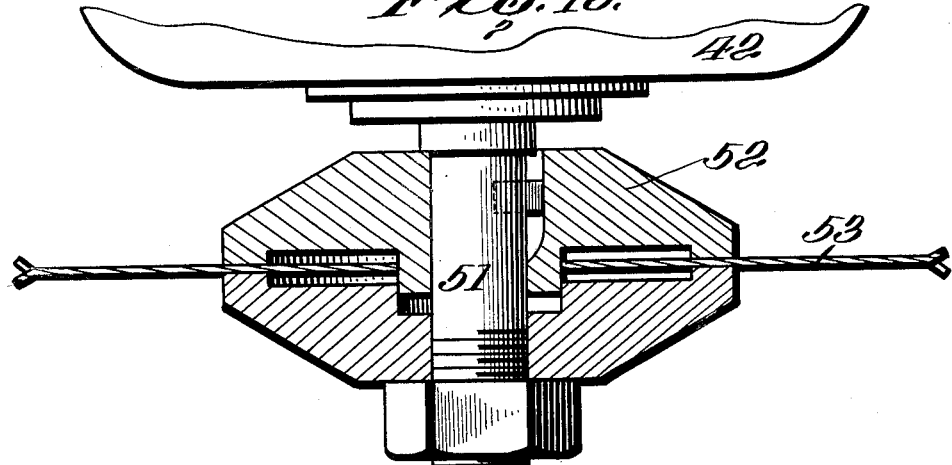
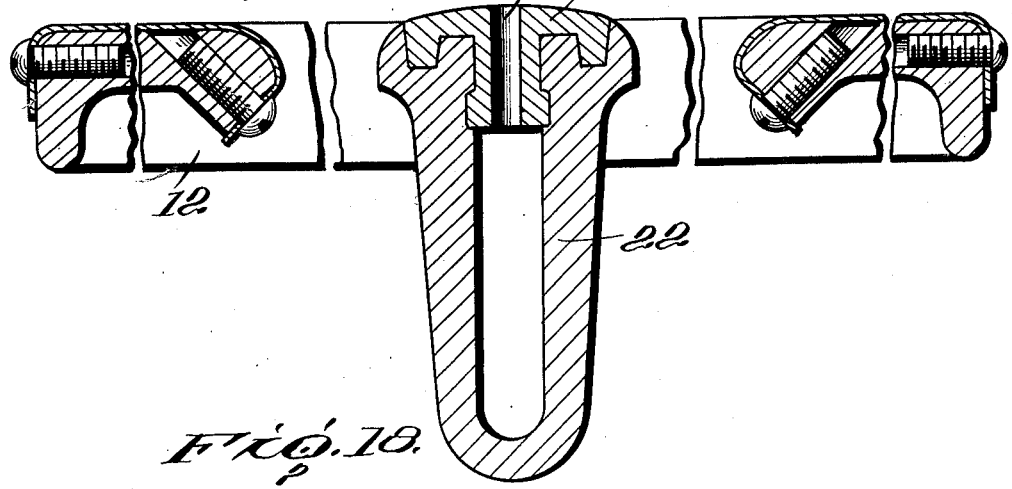
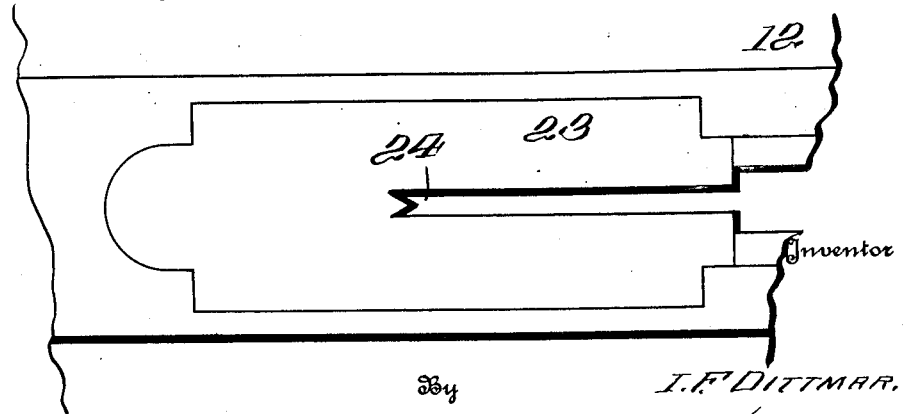

Patented Mar. 3, 1931

1,794,758

UNITED STATES PATENT OFFICE

IRVIN F. DITTMAR, OF WILLIAMSPORT, PENNSYLVANIA, ASSIGNOR TO THE CROMAR COMPANY, OF WILLIAMSPORT, PENNSYLVANIA, A CORPORATION OF PENNSYLVANIA

SAWING MACHINE

Application filed February 21, 1927. Serial No. 169,993.

This invention relates to certain new and useful improvements in sawing machines and more particularly to trim saws for cutting material at right angles to form a square cut, the object being to provide an electrically operated trim saw which can be rotated at a high rate of speed so as to form a clean cut.

Another object of my invention is to provide novel means for mounting the saw in respect to the carriage so that the same can be adjusted in respect to the carriage or table whereby the circumference or the cutting circle of the saw can be shifted so as to adjust it to the proper position.

Another object of the invention is to provide a sawing machine in which the motor is so constructed that a clearance is formed for the operator's hands when placing a piece of material on the table or removing the same therefrom, the motor support being adjustable so as to shift the same in respect to the carriage.

Another object of my invention is to provide an electric motor in which the driving shaft is so constructed that the saw can be placed on either end thereof to either side of the motor.

A still further object of the invention is to provide a novel form of guard for the saw which is adjustable so that the lower edge thereof can be shifted to such a position that it clears the material being sawed.

A still further object of the invention is to provide novel means for mounting the table so that it is maintained in such a position that the material thereon will be forced into engagement with the cutting edge of the saw to form a perfect right angle cut, the table being adjustable.

Another object of the invention is to provide novel means for limiting the movement of the table in both directions by providing a yieldable bumper in the form of a spring which not only limits the movement of the table, but aids in returning the same.

Other and further objects and advantages of the invention will be hereinafter set forth and the novel features thereof defined by the appended claims.

In the drawings,

Figure 3 is a side elevation from the opposite side to that of Figure 2;

Figure 5 is an enlarged vertical section through a portion of the frame, track and carriage showing the manner of mounting the same;

Figure 6 is a detail top plan view of a portion of a carriage;

Figure 7 is an elevation of the same;

Figure 8 is a vertical section taken on line 8—8 of Figure 6;

Figure 9 is an end elevation of the table;

Figure 10 is a section through the saw support showing the motor in plan view, showing a saw in dotted lines arranged on the other end of the shaft;

Figure 11 is an elevation of a standard for the motor support;

Figure 12 is a vertical section through the motor support;

Figure 13 is a horizontal section through the motor support;

Figure 14 is a detail elevation of one of the sections of the motor support;

Figure 15 is an edge view of the same;

Figure 16 is a section showing the manner of securing the saw on the motor shaft;

Figure 17 is a section through the table showing the construction of the saw throat;

Figure 18 is a detail top plan view of the same;

Figure 19 is a diagrammatic view showing the saw adjusted so as to cut substantially at the horizontal diameter of the cutting edge of the saw; and Figure 20 is a diagrammatic view showing the saw adjusted for cutting tangentially of the cutting edge of the saw.

Figure 1:
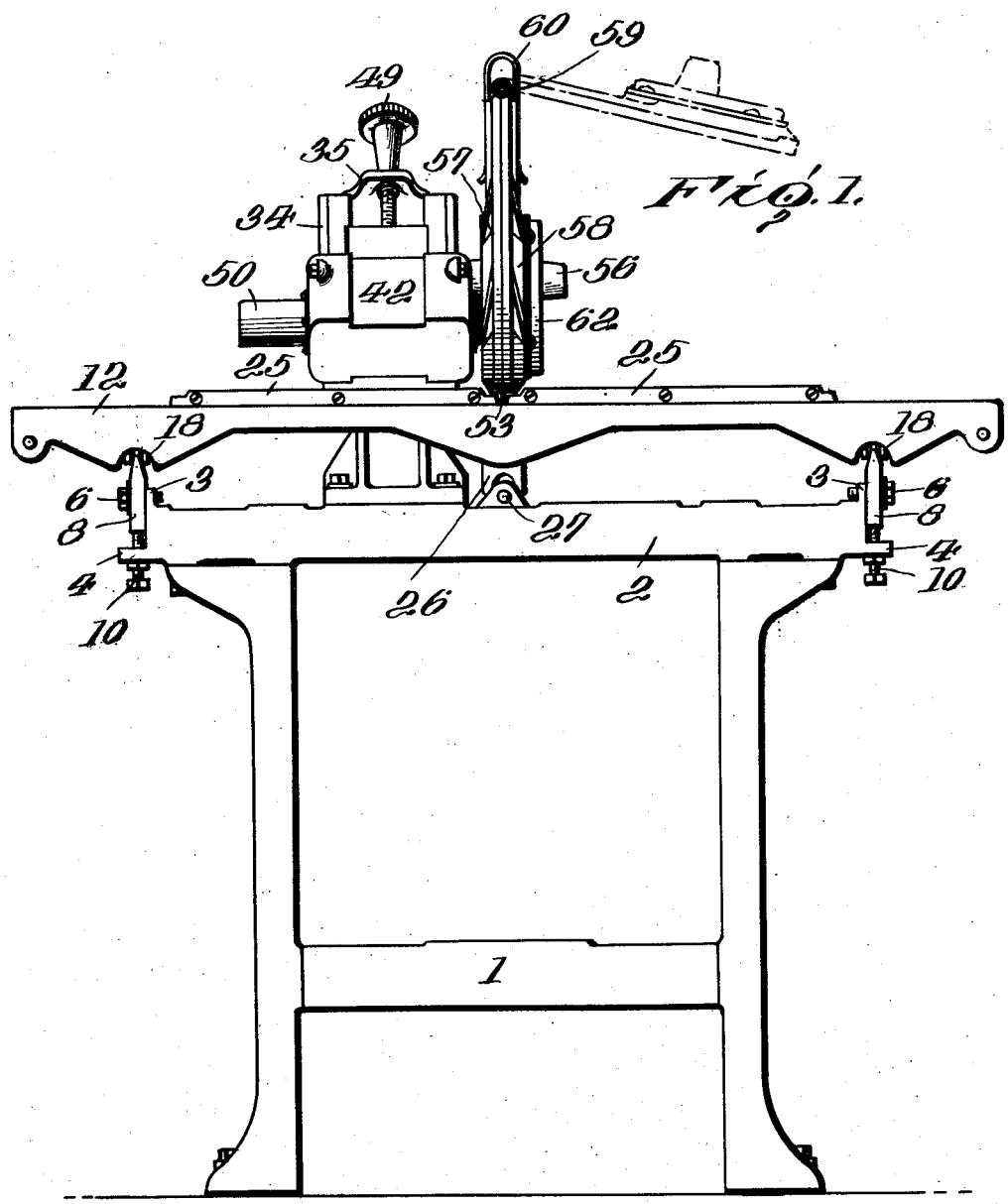
Figure 1 is a front elevation of a sawing machine constructed in accordance with my invention.

In the drawings 1 indicates a supporting frame on which is disposed a horizontally disposed frame 2 and while in the drawing I have shown these members formed separate, it, of course, is understood that they can be formed as a unit.

The frame 2 along each end is provided with a vertically disposed rib 3 and a horizontally disposed rib 4. The rib 3 is provided with threaded bores 5 adapted to receive bolts or screws 6 which extend through slots 7 formed in track 8, which is provided with a substantially V-shaped tread portion 9, the lower edge of said track being adapted to be engaged by a bolt 10 mounted in a threaded bore 11 of the horizontally disposed rib 4 so that the track can be adjusted up and down. As one of these means for fastening the same is arranged at each end of the track, of course, it can be clearly understood that the track can be adjusted to any inclined position desired for the purpose hereinafter fully described.

Arranged above the frame 2 is a table 12 which is provided adjacent each end with a substantially inverted U-shaped portion 13 having the legs thereof formed with oppositely disposed openings 14 in which are adjustably mounted cone members 15 and 16 for the balls 17 on which are mounted rollers 18 having peripheral grooves corresponding in shape to the tread of the track 9 so that the table will be mounted on ball bearings so as to travel back and forth freely.

The cone member 16 is provided with a threaded stem 16' which works into a threaded bore 15' of the cone member 15 so as to adjust the cone members in respect to one another, a set screw 19 being mounted in the end of the bore 15' for preventing the stem from turning after being adjusted in the proper position.

After the cone members have been set in the proper positions to support the balls and grooved rollers, they can be locked in the hanger formed by the inverted U-shaped portion of the table by the set screw 20 mounted in the threaded bore 21 of one of the legs of the hanger as clearly shown in Figure 5. This provides means for mounting the table on ball bearing grooved rollers mounted in hangers so as to protect the ball bearings from the sawdust and also provides means so that the table can be squared in respect to the saw by adjusting the cone members in the hangers.

The table is provided with a central throat 22, the top portion of which is closed by the convexed insert of Babbitt metal 23 having a slot 24 to receive the saw as will be hereinafter fully described. The insert extends upwardly beyond the top surface of the table so as to slightly undercut the material, which is of especial advantage when cutting flooring.

Figure 2:
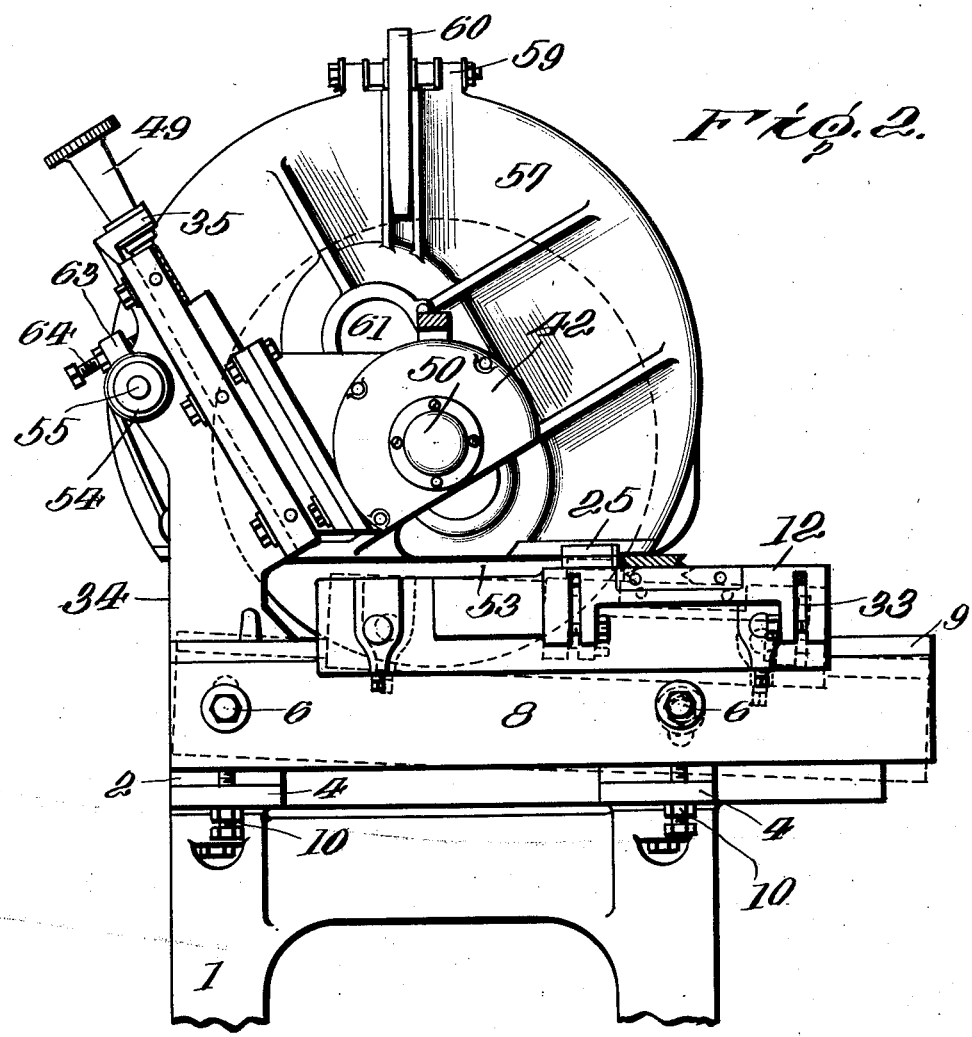
Figure 2 is a side elevation showing a table arranged on an incline in dotted lines.
Figure 4:
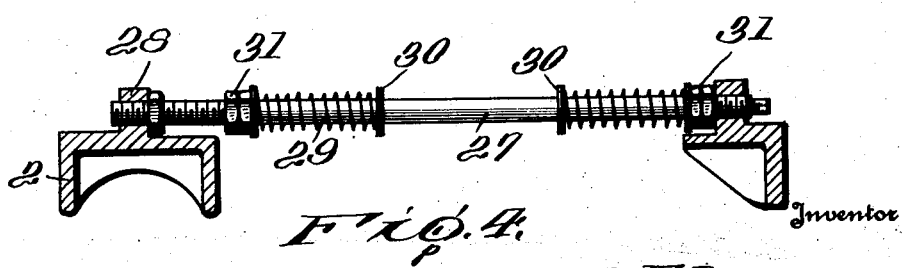
Figure 4 is a detail view of the bumper with the table.

An adjustable gauge 25 is arranged on the table against which the material is placed and held while being cut as clearly shown in Figures 2 and 3.

The throat 22 is provided with a depending bifurcated lug 26 which straddles a rod 27 provided with threaded ends mounted in threaded bores formed in bosses 28 of the frame 2, said rod being surrounded by coil springs 29 at each end carrying washers 30 at their free end which are adapted to be engaged by the bifurcated lug 26, the springs being adjusted on the rod by nuts 31 to limit the forward and backward movement of the table. These springs act as buffers so as to eliminate the shock when the table has reached its end of movement in both directions.

In practice the table is set at an incline so that after it has been forced towards the saw, it will return by gravity and by having the spring arranged so that the bifurcated lug engages the same at the end of this movement, when released the tension of the spring has a tendency to start the table so that the table moves back automatically.

The end of the table is provided with bifurcated portions 33 to provide means for connecting extension members, not shown, to increase the length of the table in cutting long material such as flooring and the like.

Mounted on the frame 2 is a standard 34, said standard being capable of being mounted on the frame to either side of the throat of the table, said standard extending upwardly at an angle of 60° in respect to the table surface and is provided with an apertured lug 35 at its top for the purpose hereinafter fully described.

The standard 34 is provided with side flanges 36 against which are arranged strips 37 having inclined faces 38 to provide a substantially dove-tailed shaped guideway in which is mounted the dove-tailed shaped tongue 39 of a motor support 40 to which is bolted the base 41 of an electric motor 42, the construction of which will be hereinafter fully described.

The guide strips 37 are secured in position by bolts 43 and are adjustable therein by set screws 44 so that as the tongue and the contacting faces of these guide strips wear, they can be adjusted so as to maintain a tight fit, the bolts 43 being mounted in bores of a greater diameter in order to allow the same to slide back and forth.

The dove-tailed shaped tongue 39 of the motor support is provided with a longitudinally disposed groove 45 which is connected together by a web 46 having a threaded bore 47 through which extends an adjusting screw 48 which is revolubly mounted at its upper end in the lug 35 and is provided with a knob 49 for rotating the same in order to adjust the electric motor up and down in respect to the table.

The electric motor is especially constructed and is provided with a flat side which is approximately at right angles in respect to the slide on which the motor is mounted in order to give room for the operator's hand in grasping the strip in holding it against the adjustable gauge on the table.

The driving shaft of the motor extends outwardly to each side in order to allow a saw to be mounted on either end thereof and when the saw is on one end, the other end is closed by a housing 50. The drive shaft 51 is threaded at each end and carries a saw clamp 52 for clamping a circular saw 53 thereon, the construction of each end of the drive shaft being the same which enables the saw to be placed on either end so that the standard can be shifted lengthwise of the frame so as to place the electric motor to either side of the throat of the table.

The standard is provided on its back with spaced apertured lugs 54 adapted to receive a shaft 55 on which is mounted a hub 56 of a sectional guard composed of sections 57 and 58 pivotally connected together at 59 and held in contact with one another by a U-shaped clip 60. The sections 57 and 58 are provided with elongated slots 61, the slot on the outer section being closed by a cover plate 62.

The hub members 56 are formed detachable and are secured in position on the sections by screws as clearly shown, which allows the same guard to be used when the saw is transferred from one end of the drive shaft of the motor to the other. The hub portion is provided with threaded lugs 63 in which are adjustably mounted stop screws 64 adapted to engage the standard 34 so as to limit the swinging movement of the guard in respect to the table and in practice the guard is set so that it just rides clear of the material being sawed which eliminates any friction and the possibility of the operator's fingers coming in contact with the rotary saw. By having the saw guard formed of two sections pivotally connected together at their upper edge and adapted to swing in respect to the other, by removing the U-shaped spring clip 60, the outer section can be swung outwardly so that the saw can be inserted or removed.

The frame 2 and table are of skeleton form so that a clearance is formed for the pieces of material cut off from the end of the strip in order to allow the same to drop into a chute and by having the throat constructed as shown, the sawdust can be readily drawn away in the usual manner.

In the operation of the saw as herein shown and described which is especially adapted to be used for trimming the ends of flooring where it is desired to have an exceptionally clean and true cut, the strip of material is placed on the table by the operator and as the electric motor is driving the circular saw at a high rate of speed, when the strip is forced into contact with the cutting edge, the strip is cut at right angles and by having the convexed Babbitt throat extending upwardly beyond the surface of the table, the ends are slightly undercut so that when the ends are placed together, a square joint closed at the top surface is formed.

The table is mounted upon grooved rollers which in turn travel on adjustably mounted tracks, the tracks being adjustable for changing the inclination thereof in order to allow the table to be set so that in the operation of the sawing machine, when the operator places a piece of material against the gauge thereof he forces the table towards the saw against the force of gravity so that when the piece of material has been cut and the table released, it will return to its normal position. The rollers being adjustable allow the table to be adjusted and trued so that the material on the table will be maintained at right angles to the saw at all times and by having a throat formed of Babbitt metal, the throat can be removed and a new one inserted as it wears.

By having the saw carried directly upon the motor shaft, it can be shifted from one end to the other and by having the motor adjustably mounted, it can be adjusted in respect to the table so that various sizes of saws can be used.

From the foregoing description it will be seen that I have provided a very novel form of sawing machine in which a flat-sided electrical motor is employed for driving the saw directly at a high rate of speed so that when a piece of material carried by the movable table is forced into engagement therewith, it will cut quickly and truly, the construction of the machine being very simple and the parts so arranged that all danger of getting out of order in operation is prevented.

By having the motor adjustably mounted various diameters of saws can be used and the circumference of the saw adjusted so that the cutting circle can be properly adjusted to any material whether soft or hard, or open or closed grain, whereby I am able to adjust the saw and to use saws with teeth of various constructions to suit the material being operated on in order to obtain a smooth, clean cut and by having the table constructed as shown, the material cut off the end of the strip drops through the table without handling.

It will also be seen that by having the throat on a plane slightly above the table that the edge of the material is undercut slightly so that when two strips are arranged with their ends in engagement with one another a very smooth, tight joint can be formed.

What I claim is:

1. A motor support having a motor mounted thereon provided with a drive shaft extending out to each side thereof adapted to receive a saw, a guard supporting shaft carried by said support and arranged parallel with said drive shaft, a guard having oppositely disposed hub portions adapted to be pivotally mounted on either end of said supporting shaft adapted to enclose said saw, and means carried by said hub portions for limiting the swinging movement of said guard in one direction.

2. A motor support having a motor mounted thereon provided with a drive shaft extending out to each side thereof adapted to receive a saw, a guard supporting shaft carried by said support and arranged parallel with said drive shaft, a sectional guard enclosing said saw having oppositely disposed hub portions adapted to be pivotally mounted on either end of said supporting shaft and means for limiting the swinging movement of said guard.

3. An interchangeable guard for sawing machines having a drive shaft for attaching a saw to either end thereof comprising sectional members pivotally connected together at their upper ends, each section having a detachable hub for supporting the guard over the saw and a U-shaped member for clamping said sections together, said hub being adapted to be pivotally mounted on its supporting shaft arranged parallel with the drive shaft.

4. In a sawing machine the combination with a saw carrying shaft having means for clamping a saw to either end thereof, a supporting shaft arranged parallel with the saw carrying shaft, of a guard capable of being mounted to enclose either of said saws, said guard being pivotally mounted on the supporting shaft and means for limiting the swinging movement of said guard.

5. A motor support having a motor mounted thereon provided with a drive shaft extending out to each side thereof adapted to receive a saw, a guard supporting shaft carried by said support and arranged parallel with the drive shaft, a sectional guard adapted to be mounted on either end of said supporting shaft formed of two sections pivotally connected together at their upper edges for enclosing said saw and means for limiting the swinging movement of said guard.

6. A motor support having a motor mounted thereon provided with a drive shaft extending out to each side thereof adapted to receive a saw, a guard supporting shaft carried by said support and arranged parallel with the drive shaft, a sectional guard adapted to be pivotally mounted on either end of said supporting shaft, said guard being formed of two sections pivotally connected together at their upper edges for enclosing said saw and a U-shaped member for holding said sections together, said guard having oppositely disposed hub portions mounted on the supporting shaft and means for limiting the swinging movement of said guard.

In testimony whereof, I hereunto affix my signature.

IRVIN F. DITTMAR.